(12) United States Patent
Saito et al.

(10) Patent No.: US 7,771,817 B2
(45) Date of Patent: Aug. 10, 2010

(54) GASKET MATERIAL

(75) Inventors: Hiroshi Saito, Nara (JP); Kenichiro Ishikawa, Nara (JP)

(73) Assignee: Nichias Corporation, Tokyo (JP)

(*) Notice: Subject to any disclaimer, the term of this patent is extended or adjusted under 35 U.S.C. 154(b) by 786 days.

(21) Appl. No.: 11/065,089

(22) Filed: Feb. 25, 2005

(65) Prior Publication Data
US 2005/0249935 A1 Nov. 10, 2005

(30) Foreign Application Priority Data
Mar. 31, 2004 (JP) .................. P. 2004-102157

(51) Int. Cl.
B32B 3/26 (2006.01)
B32B 9/00 (2006.01)

(52) U.S. Cl. .................. 428/304.4; 428/318.4

(58) Field of Classification Search .............. 428/304.4, 428/318.4
See application file for complete search history.

(56) References Cited

U.S. PATENT DOCUMENTS 4,307,127 A * 12/1981 Shah .................. 427/461
5,150,910 A * 9/1992 Udagawa .................. 277/592
5,852,957 A 12/1998 Saito
5,958,571 A 9/1999 Omura
6,565,692 B1 5/2003 Omura et al.
2003/0075873 A1 4/2003 Nakamura

FOREIGN PATENT DOCUMENTS

| DE | 198 57 026 A1 | 6/1999 |
|---|---|---|
| EP | 0 516 356 A1 | 12/1992 |
| EP | 0 867 646 A2 | 9/1998 |
| EP | 1 306 587 A2 | 5/2003 |
| JP | 61278541 | 12/1986 |
| JP | 63264691 | 11/1988 |
| JP | 4-45548 | 2/1992 |
| JP | 5-48742 | 2/1993 |

OTHER PUBLICATIONS

Definition of gasket by Merriam-Webster Online Dictionary.*

* cited by examiner

*Primary Examiner*—Victor S Chang
(74) *Attorney, Agent, or Firm*—Nixon & Vanderhye P.C.

(57) ABSTRACT

A gasket material contains a steel plate and a foamed rubber layer disposed on both sides or one side of the steel plate. The foamed rubber layer is provided by a process including foaming a pre-foamed layer containing a pre-foamed composition. The pre-foamed layer has a thickness of 15 to 50 .mu.m, and the pre-foamed composition has a foaming factor of 2 to 4.

13 Claims, 1 Drawing Sheet

GASKET MATERIAL

FIELD OF THE INVENTION

The present invention relates to a gasket material used for forming a gasket to be mounted on a vehicle engine, a method for producing the gasket material and a gasket comprising the gasket material.

BACKGROUND OF THE INVENTION

A rubber coated stainless steel plate obtainable by providing a rubber layer on a stainless steel plate is generally used for a metal gasket, particularly for a head gasket, to be mounted on a vehicle engine. Since the rubber layer of such head gasket is heated to about 200° C. under a high surface pressure while the engine is running, a solid rubber layer that is not foamed (hereinafter referred to as "unfoamed rubber layer") that hardly deteriorates by heat and pressure is usually used as the rubber layer (see Japanese Patent Application Publication 4-45548(B2), for example).

The metal gasket using the unfoamed rubber layer achieves an excellent sealing property when used together with a bead. Although the metal gasket exhibits the excellent sealing property when a surface roughness of sealed members, e.g., a flange, is 12.5 Ra or less, the sealing property is not ensured in some cases when the surface roughness is higher than 12.5 Ra. Further, since the metal gasket is sealed by concentrating a bolt load on a bead portion (embossed portion), a sufficient sealing property is not achieved in some cases when there is a casting hole (a slight depression on the surface of sealed members, e.g., a flange, caused by foaming during casting; see FIG. 1) across a bead line.

Also, a metal gasket having a foamed rubber layer provided thereon is used (see Japanese Patent Application Publication 5-48742(B2), for example). Although the metal gasket with the foamed rubber layer is capable of sealing a flange having a high surface roughness and a casting hole, it is generally difficult to achieve foaming (particularly with a foaming factor of 2 or more) when a thickness of a rubber layer before foaming is not lower than about 70 μm. Further, the rubber layer before foaming of the metal gasket with the foamed rubber layer is relatively thick, the foamed rubber layer deteriorates under the conditions of a high temperature and a high pressure to result in a reduction in axial force of a bolt. In order to obtain the foamed rubber layer, a micro-encapsulation and a heat decomposition method using a chemical foaming agent are generally employed. Since a foamed rubber layer obtained by the micro-encapsulation has a low foaming factor, such foamed rubber layer has a lower effect for sealing casting holes. Also, since many of cells of the foamed rubber layer are separately closed (hereinafter referred to as "closed cells"), shrinkage of each of the cells is caused at a low temperature (lower than 0° C.), thereby causing a reduction in axial force of a bolt. Further, when a sealing surface pressure is insufficient, the foamed rubber layer does not perfectly crush to cause the foamed rubber layer to deteriorate during use, thereby undesirably resulting in a stress relaxation of a bolt.

As described above, though the gasket with a unfoamed rubber layer is free from a deterioration of the rubber layer under the conditions of a high temperature and a high pressure, such gasket is not useful for sealing a sealed member, e.g., a member having casting holes or the flange having a high surface roughness. In turn, the gasket with the foamed rubber layer has a problem of deterioration under a high temperature and a high pressure.

An object of the present invention is to provide a gasket material to be used for a gasket which is free from a deterioration of a rubber layer under the conditions of a high temperature and a high pressure as well as from a shrinkage of the rubber layer at a low temperature and capable of satisfactorily sealing a sealed member, e.g., a member having casting holes or a flange having a high surface roughness.

SUMMARY OF THE INVENTION

The present inventors have made eager investigation to examine the problem and have conducted extensive researches of polymers (e.g., mooney values and amount thereof), foaming agents (e.g., types and amount thereof), vulcanizing agents (e.g., types thereof) and vulcanization accelerators (e.g., types thereof) to be contained in a rubber in the aim of realizing a gasket material used particularly for a head gasket. As a result, it has been found that it is possible to prevent a rubber flow under the conditions of a high temperature and a high pressure, to minimize shrinkage of a foamed rubber layer at a low temperature, and to seal a sealed member having a casting hole and a flange having a high surface roughness by reducing a thickness of a rubber layer before foaming to 15 to 50 μm and adjusting a ratio of the volume of cells that intercommunicate each other (hereinafter referred to as "open cells") to the volume of total cells in a foamed rubber layer (hereinafter referred to as "open cell ratio") to 80% or more. The present invention is based on such findings.

The present invention is mainly directed to the following items:

(1) A gasket material comprising: a steel plate; and a foamed rubber layer disposed on both sides or one side of the steel plate, wherein the foamed rubber layer is provided by a process comprising foaming a pre-foamed layer comprising a pre-foamed composition, wherein the pre-foamed layer has a thickness of 15 to 50 μm and a ratio of the thickness of a rubber layer after foaming (foamed rubber layer) to that before foaming (pre-foamed rubber layer) of 2 to 4. Hereinafter, the ratio is referred to as "foaming factor".

(2) The gasket material according to item 1, wherein the pre-foamed composition comprises: 20 to 70% by weight of a polymer having a mooney value of 10 to 70; and 20 to 60% by weight of a heat decomposable chemical foaming agent, based on the total weight of the composition, wherein the foamed rubber layer has an open cell ratio of 80% or more.

(3) The gasket material according to item 2, wherein the pre-foamed composition further comprises a vulcanizing agent.

(4) The gasket material according to item 2, wherein the pre-foamed composition further comprises a vulcanization accelerator.

(5) The gasket material according to item 2, wherein the content of the polymer in the pre-foamed composition is 20 to 60% by weight based on the total weight of the composition.

(6) The gasket material according to item 2, wherein the polymer in the pre-foamed composition has a mooney value of 20 to 60.

(7) The gasket material according to item 2, wherein the content of the heat decomposable chemical foaming agent in the pre-foamed composition is 20 to 60% by weight based on the total weight of the composition.

(8) The gasket material according to item 4, wherein the vulcanization accelerator provides a time period required for reaching to T50 in Curast data at 150° C. of four minutes or less.

(9) The method for producing a gasket material comprising: preparing a coating liquid containing a pre-foamed composition, applying the coating liquid on a steel plate to obtain a pre-foamed layer having a thickness of 15 to 50 µm and a foaming factor of 2 to 4, and foaming the pre-foamed layer by a heat treatment to obtain a foamed rubber layer.

(10) The method for producing a gasket material according to item 9, wherein the pre-foamed composition comprises: 20 to 70% by weight of a polymer having a mooney value of 10 to 70; and 20 to 60% by weight of a heat decomposable chemical foaming agent, based on the total weight of the composition, wherein the foamed rubber layer has an open cell ratio of 80% or more.

(11) The method for producing a gasket material according to item 10, wherein the pre-foamed composition further comprises a vulcanizing agent.

(12) The method for producing a gasket material according to item 10, wherein the pre-foamed composition further comprises a vulcanization accelerator.

(13) A gasket comprising a gasket material comprising: a steel plate; and a foamed rubber layer disposed on both sides or one side of the steel plate, wherein the foamed rubber layer is provided by a process comprising foaming a pre-foamed layer comprising a pre-foamed composition, wherein the pre-foamed layer has a thickness of 15 to 50 µm and a foaming factor of 2 to 4.

(14) The gasket according to item 13, wherein the pre-foamed composition comprises: 20 to 70% by weight of a polymer having a mooney value of 13 to 70; and 20 to 60% by weight of a heat decomposable chemical foaming agent, based on the total weight of the composition, wherein the foamed rubber layer has an open cell ratio of 80% or more.

(15) The gasket according to item 14, wherein the pre-foamed composition further comprises a vulcanizing agent.

(16) The gasket according to item 14, wherein the pre-foamed composition further comprises a vulcanization accelerator.

DETAILED DESCRIPTION OF THE INVENTION

Figure 1:
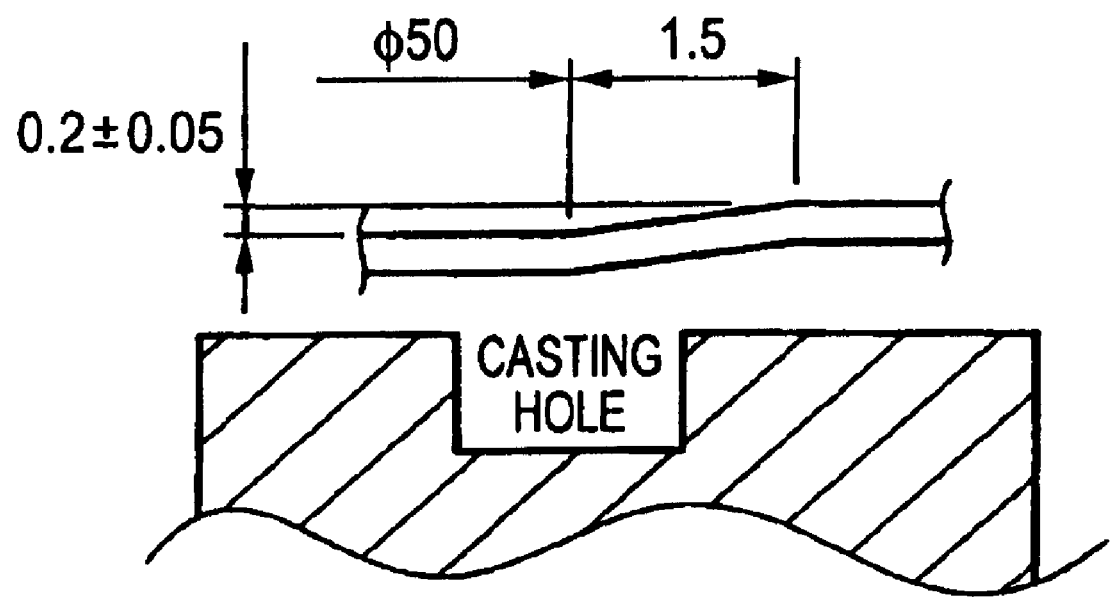
FIG. 1 is a schematic drawing showing a test method of a casting hole sealing test.

The present invention will hereinafter be described in detail.

The gasket material of the present invention has a steel plate and a foamed rubber layer formed on both sides or one side of the steel plate. A composition used for forming the foamed rubber layer preferably contains 20 to 70 wt %, based on the total weight of the composition, of a polymer having a mooney value of 10 to 70. More preferably, the mooney value is 20 to 60, and the content is 20 to 60 wt % based on the total weight of the composition. By using such polymer, it is possible to effectively prevent a deterioration of the foamed rubber layer.

The polymer is not limited in type as far as the mooney value is in the above-described range. Examples thereof include those that have heretofore been used for gaskets, such as an NBR, an HNBR, a fluororubber, an EPDM, and an acrylic rubber. It is preferable to use the NBR, HNBR, and the fluororubber. Also, in the case of using the NBR, it is preferable that a content of acrylonitrile group in NBR (%) (hereinafter referred to as "AN value") is from 39 to 52, more preferably from 40 to 48, for the purpose of imparting an oil resistance.

Further, the composition preferably contains a heat decomposable chemical foaming agent. Although the heat decomposable foaming agent is not limited, it is preferable that a foaming temperature thereof is 120° C. or more, more preferably from 150 to 210° C. An amount of the foaming agent in the composition is preferably from 20 to 60 wt %, more preferably from 15 to 35 wt %, based on the total weight of the composition.

Further, a vulcanizing agent and a vulcanization accelerator is preferably added to the composition. The vulcanizing agent is preferably added in a large amount so as to achieve a high vulcanization density. In the case of sulfur vulcanization, the vulcanizing agent is preferably used at 1.5 to 4.5 phr. It is preferable to use the vulcanization accelerator which enables rapid vulcanization, i.e., which provides a time period required for reaching to T50 in Curast data at 150° C. of four minutes or less. A time period required for reaching to T50 in Curast data at 150° C. means a time period that a rubber requires to reach T50 when vulcanization is done at 150° C.

The above composition is dissolved into an organic solvent to obtain a coating liquid which is applied on the steel plate to obtain a pre-foamed layer. The organic solvent is not limited as far as it dissolves the composition. An example thereof is a mixed solvent of 10 to 90 wt % of an aromatic hydrocarbon-based (or ketone-based) solvent such as toluene and 10 to 90 wt % of an ester-based solvent. The composition is dissolved into the organic solvent in such a way that a solid concentration thereof is preferably 10 to 60 wt % based on the weight of the coating liquid.

The steel plate is not particularly specified in the present invention. Examples thereof include those that have heretofore been used for gaskets, such as a stainless steel plate (ferrite-based, martensite-based, and austenite-based stainless steel plates), an SPCC steel plate, and an alumin-u steel plate. Generally, such steel plates are used after treated with an alkaline degreasing and a chemical conversion coating for forming a rust proof coating using a chromate finishing agent, a non-chromate finishing agent, or the like, and the same treatments may be performed in the present invention. Also, a zinc phosphate coating or an iron phosphate coating is formed in some cases when using the SPCC steel plate, and the same coating may be formed when using the SPCC steel plate in the present invention. Also, a steel plate having its surface roughened by shot blast or scotch blast may be used.

Although a method of applying the coating liquid containing the composition is not particularly limited, it is preferable to employ a method that enables to control a thickness of the pre-foamed layer. Examples thereof include a coating method using a gap coater or a roll coater. The coating thickness is preferably from 15 to 50 µm, and the foaming agent is foamed by a heat treatment at preferably about 150 to 240° C. for 5 to 15 minutes to form the foamed rubber layer. The foaming conditions such as the vulcanizing agent, the foaming agent, and the heating time are adjusted so that the pre-foamed layer has a foaming factor of from 2 to 4 and the foamed rubber layer to be obtained has a open cell ratio of 80% or more. It is possible to control the foaming factor by using the polymer having the above-described mooney value and adding the vulcanizing agent and the foaming agent to the polymer at, the above-described proportion. Particularly, the foaming factor depends on the mooney value of the polymer and the vulcanization speed. When the mooney value of the polymer is too low, the polymer is expanded too much by a foaming gas. When the mooney value is too high, the expansion of the polymer by the foaming gas is suppressed. When the vulcanizing speed is too high, the vulcanization progresses before the polymer is expanded by the foaming gas to suppress the foaming factor. When the vulcanization speed is too low, the polymer is expanded by the foaming gas before the rubber is cured by the vulcanization to increase the foaming factor. For instance, when a polymer having a mooney value of 20 to 40 is used in combination with a vulcanization accelerator of a low vulcanizing speed (Curast data: a time period required for reaching to T50 at 150° C. is about 5 to 6 minutes) and a foaming agent of a low decomposition temperature, the foaming factor is increased On the other hand, when a polymer having a mooney value of 40 to 60 is used in combination with a vulcanization accelerator of a high vulcanizing speed (Curast data: a time period required for reaching to T50 at 150° C. is about 1 to 3 minutes) and a foaming agent of a high decomposition temperature, the foaming factor is reduced. Thus, the foaming factor is controlled by changing the combination of the polymer, the vulcanization accelerator, and the foaming agent.

The gasket material which is obtainable as described above is free from a deterioration of a rubber layer under the conditions of a high temperature and a high pressure as well as from shrinkage of the rubber layer at a low temperature and capable of satisfactorily sealing a casting hole and a flange having a high surface roughness as described later in Examples

EXAMPLES

The present invention is now illustrated in greater detail with reference to Examples and Comparative Examples, but it should be understood that the present invention is not to be construed as being limited thereto.

Examples 1 to 3 and Comparative Examples 1 to 7

Sample Preparation

Each of compositions containing a polymer, a foaming agent, a vulcanizing agent and a vulcanization accelerator as shown in Table 1 was dissolved into an organic solvent containing toluene and ethyl acetate to prepare a coating liquid in such a way that the solid concentration of the composition in each of the coating liquids was 40 wt % based on the weight of the coating liquid. Each of the coating liquids was applied with a roll coater on a stainless steel that has been applied a non-chromate treatment and a primer treatment to obtain a pre-foamed layer (see Table 1 for thickness of the each pre-foamed layer), and then a heat treatment was performed at 210° C. for 10 minutes to obtain samples each having a foamed rubber layer. Evaluations of the samples were conducted as follows.

TABLE 1

| | Polymer (A) | | | | Amount of (A) (wt %) | Amount of (B) (wt %) | Thickness of pre-foamed layer (μm) | Vulcanizing agent | Vulcanization Accelerator | |
|---|---|---|---|---|---|---|---|---|---|---|
| | Kind | AN value (%) | Mooney value | Foaming Agent (B) | | | | | Kind | Product name |
| Sample 1 | NBR | 40 | 50 | Heat Decomposable Type (Azodicarbonamide-based) | 50 | 25 | 35 | Sulfur | Sulfenamide-based | Nocceler CZ |
| Sample 2 | NBR | 41.5 | 50 | Heat Decomposable Type (Dinitrosopantamethylenetetramine-based) | 30 | 40 | 20 | Sulfur | Sulfenamide-based | Nocceler CZ |
| Sample 3 | H-NBR | 43.2 | 70 | Heat Decomposable Type (Azodicarbonamide-based) | 50 | 30 | 15 | Sulfur | Thiazole-based/ Zinc dithiocarbamate-based | Nocceler M/ Nocceler PZ |
| Sample 4 | NBR | 43 | 45 | Heat Decomposable Type (Azodicarbonamide-based) | 50 | 25 | 60 | Sulfur | Thluram-based | Nocceler TRA |
| Sample 5 | NBR | 43 | 45 | Microcapsule Type (Vinylidene chloride-acrylonitrile copolymer) | 50 | 25 | 35 | Sulfur | Sulfenamide-based | Nocceler CZ |
| Sample 6 | NBR | 41 | 80 | Heat Decomposable Type (Azodicarbonamide-based) | 50 | 30 | 40 | Sulfur | Thiazole-based/ Thiuram-based | Nocceler M/ Nocceler TT |
| Sample 7 | NBR | 43 | 45 | Heat Decomposable Type (Dinitrosopentamethylenetetramine-based) | 50 | 15 | 35 | Sulfur | Thiazole-based/ Thiuram-based | Nocceler M/ Nocceler TT |
| Sample 8 | NBR | 41.5 | 50 | Heat Decomposable Type (Azodicarbonamide-based) | 15 | 30 | 40 | Sulfur | Thiazole-based/ Zinc dithiocarbamate-based | Nocceler M/ Noccceler PZ |

TABLE 1-continued

| | Polymer (A) | | | | Amount of (A) (wt %) | Amount of (B) (wt %) | Thickness of pre-foamed layer (μm) | Vul-canizing agent | Vulcanization Accelerator | |
| --- | --- | --- | --- | --- | --- | --- | --- | --- | --- | --- |
| | Kind | AN value (%) | Mooney value | Foaming Agent (B) | | | | | Kind | Product name |
| Sample 9 | NBR | 41.5 | 50 | Microcapsule Type (Vinylidene chloride-acrylonitrile copolymer) | 50 | 25 | 80 | Sulfur | Thiazole-based/ Thiuram-based | Nocceler M/ Nocceler TT |
| Sample 10 | NBR | 41.5 | 50 | None | 50 | 25 | 35 | Sulfur | Sulfenamide-based | Nocceler CZ |

Note 1:
Polymers (A) used in Samples 1-3 and 8-10 are manufactured by ZEON Corporation. Polymers (A) used in Samples 2, 4-7 are manufactured by JSR Corporation Note 2:
Foaming agents (B) used in Samples 1-8 and 10 are manufactured by SANKO KASEI Co., Ltd. Foaming agents (B) used in Samples 5 and 9 are manufactured by Matsumoto Yushi-Seiyaku Co., Ltd.

Note 3:
Sulfurs used in Samples 1-10 are manufactured by Tsurumi Chemical Corporation.

Note 4:
Vulcanization accelerators used in Samples 1-10 are manufactured by Ouchishinko Chemical Industrial Co., Ltd.

Evaluation Method

1. Foaming Factor

The foaming factor was calculated from a thickness of a pre-foamed layer and a thickness of a foamed rubber layer using the following formula (the thicknesses thereof were measured by using a micrometer).

(Thickness of foamed rubber layer/Thickness of pre-foamed layer)=Foaming Factor

2. Measurement of Open Cell Ratio

Each of the samples was soaked into water and then subjected to a vacuum degassing to replace the air in cells in the foamed rubber layer with water. The test was conducted until a weight after the replacement with water became constant, and an open cell ratio was calculated by using the following formula.

Weight of replaced water/(Volume of foamed rubber layer−Volume of pre-foamed layer)×100=Open cell ratio 3. Heat Resistance Flowability The samples were subjected to a test under the conditions of a surface pressure of 100 MPa at 150° C. for 22 hours, and appearances after the test were observed with a microscope to evaluate the appearance based on the following criteria.

Evaluation Criteria

A: without rubber flow
B: with rubber flow

4. Torque Down Rate

Each of the samples was subjected to a test to measure a torque down rate as follows.

(1) Each of the samples was fastened to a flange with a bolt by a torque wrench to measure an initial torque.

(2) In the state of (1) mentioned above, the sample was cooled to −35° C., and a mark was appended to the flange and the bolt by appending the mark at a position of a contact surface thereof, and then the bolt was unfastened.

(3) Each of the samples was re-fastened to the marked flange with the marked bolt by a torque wrench, in such a manner that marks of the flange and the bolt were aligned, to measure a torque at −35° C.

The initial torque (at an ordinary temperature) of each of the samples was compared with the torque at −35° C., and torque down rate was calculated by using the following formula.

[Initial torque−(Torque at −35° C.)]/Initial torque× 100=Torque down rate

5. Sealing Test

Gaskets of Examples 1 to 3 and Comparative Examples 1 to 7, having a shape as shown in the following Tables 2 and 3, were prepared by using above-mentioned Samples 1 to 10. Then, each of the gaskets of Examples and Comparative Examples were set on the flange having a shape shown in Tables 2 and 3, and the gaskets were subjected to the following tests to evaluate the gaskets by the following criteria.

Evaluation Criteria

A: without leakage of air
B: with leakage of air

Casting Hole Sealing Test (1) As shown in FIG. 1, each of the samples was processed to obtain a gasket having a half bead shape of a height of 0.2 mm and a width of 1.5 mm and a half bead center diameter of 51.5 mm. The gasket was set on a flange having a casting hole (diameter: 2.5 mm, depth: 2.5 mm) so that the casting hole was located at a position of the half beat center and then fastened to the flange at a bead linear load of 100 N/cm.

(2) In the state of (1), air (200 kPa) was supplied to the flange through a nozzle at the center of the flange to measure an amount of leaked air.

Surface Roughness Sealing Test (1) Each of the samples was processed to obtain a gasket having a half bead shape of a height of 0.2 mm and a width of 1.5 mm and a half bead center diameter of 51.5 mm. The gasket was set on a flange having a surface roughness of 50 Ra so that a casting hole was located at a position of the half bead center and then fastened to the flange at a bead linear load of 100 N/cm.

(2) In the state of (1), air (200 kPa) was supplied to the flange through a nozzle at the center of the flange to measure an amount of leaked air.

TABLE 2

Casting hole Sealing Test

| Flange | Material | SS50C was used for flange and bolt |
|---|---|---|
| | Surface Roughness | 12 Ra |
| | Casting hole Diameter | Diameter of 2.5 mm × depth of 2.5 mm |
| | Bead Linear Load | 100 N/cm |
| Gasket | Shape | Outer diameter 75 mm × inner diameter 47 mm |
| | | Bead center diameter: 51.5 mm |
| | | Half bead: height of 0.2 mm × width of 1.5 mm |

TABLE 3

Surface Roughness Sealing Property

| Flange | Material | SS50C was used for flange and bolt |
|---|---|---|
| | Surface Roughness | 50 Ra |
| | Bead Linear Load | 100 N/cm |
| Gasket | Shape | Outer diameter 75 mm × inner diameter 47 mm |
| | | Bead center diameter: 51.5 mm |
| | | Half bead: height of 0.2 mm × width of 1.5 mm |

Results of the foregoing measurements and experiments are shown in the following Table 4.

TABLE 4

| | | Rubber Layer | | | Heat | | Sealing Test | |
|---|---|---|---|---|---|---|---|---|
| | Sample No. | Thickness before Foaming (μm) | Foaming Factor | Open cell ratio (%) | Resistance Flowability | Torque Down Rate (%) | Casting hole | Surface Roughness |
| Example 1 | Sample 1 | 35 | 3 | 100 | A | 0 | A | A |
| Example 2 | Sample 2 | 20 | 4 | 100 | A | 0 | A | A |
| Example 3 | Sample 3 | 15 | 3 | 100 | A | 0 | A | A |
| Comparative Example 1 | Sample 4 | 60 | 2.5 | 100 | B | 5 | A | A |
| Comparative Example 2 | Sample 5 | 35 | 3 | 20 | A | 40 | A | A |
| Comparative Example 3 | Sample 6 | 40 | 1.3 | 60 | A | 0 | B | B |
| Comparative Example 4 | Sample 7 | 35 | 1.2 | 85 | A | 0 | B | B |
| Comparative Example 5 | Sample 8 | 40 | 1.2 | 80 | A | 0 | B | B |
| Comparative Example 6 | Sample 9 | 80 | 2.5 | 20 | B | 80 | A | A |
| Comparative Example 7 | Sample 10 | 35 | 1 | 0 | A | 0 | B | B |

From Table 4, it is apparent that the gasket of Examples each having the foamed rubber layer according to the present invention are capable of achieving satisfactory results in terms of heat resistance flowability, torque down, and sealing test. In contrast, the gasket of Comparative Example 1 which has the excessive thickness of the pre-foamed layer has poor heat resistance flowability and inferior torque down. The gasket of Comparative Example 2 which was prepared by using the microcapsule type foaming agent has the small open cell ratio and the inferior torque down. The gasket of Comparative Example 4 of the excessive mooney value has the low foaming factor and the inferior sealing property. The gasket of Comparative Example 5 prepared by using the excessively small amount of foaming agent has the low foaming factor and the inferior sealing property. The gasket of Comparative Example 6 prepared by using the excessively small amount of polymer has the small amount of open cell ratio, the worst torque down, and the inferior heat resistance flowability. Since the gasket of Comparative Example 7 which was prepared by using the microcapsule type foaming agent has the excessive thickness of the pre-foamed layer, the gasket has the worst foaming factor, the smallest open cell ratio, and the inferior sealing property.

By using the gasket material, the method of producing the gasket, of the present invention, it is possible to obtain a gasket which is free from a deterioration of the rubber layer under the conditions of a high temperature and a high pressure as well as from a reduction in the rubber layer at a low temperature and capable of satisfactorily sealing a casting hole and a flange having a high surface roughness.

While the present invention has been described in detail and with reference to specific embodiments thereof, it will be apparent to one skilled in the art that various changes and modifications can be made therein without departing the spirit and scope thereof.

The present application is based on Japanese Patent Application No. 2004-102157 filed on Mar. 31, 2004, and the contents thereof are incorporated herein by reference.

What is claimed is:

1. A structure comprising:
   a steel plate; and
   a foamed rubber layer disposed on both sides or one side of the steel plate,
   wherein the foamed rubber layer is provided by a process comprising foaming a pre-foamed layer comprising a pre-foamed composition,
   wherein the pre-foamed layer has a thickness of 15 to 50 μm and a foaming factor of 2 to 4, and the pre-foamed composition comprises:
   20 to 70% by weight of a polymer having a mooney value of 10 to 70; and 20 to 60% by weight of a heat decomposable chemical foaming agent, based on the total weight of the composition, wherein the foamed rubber layer has an open cell ratio of 80% or more.

2. The structure according to claim 1, wherein the pre-foamed composition further comprises a vulcanizing agent.

3. The structure according to claim 1, wherein the pre-foamed composition further comprises a vulcanization accelerator.

4. The structure according to claim 1, wherein the content of the polymer in the pre-foamed composition is 20 to 60% by weight based on the total weight of the composition.

5. The structure according to claim 1, wherein the polymer in the pre-foamed composition has a mooney value of 20 to 60.

6. The structure according to claim 1, wherein the content of the heat decomposable chemical foaming agent in the pre-foamed composition is 20 to 60% by weight based on the total weight of the composition.

7. The structure according to claim 3, wherein the vulcanization accelerator provides a time period required for reaching to T50 in Curast data at 150° C. of four minutes or less.

8. A method for producing a gasket material comprising:
preparing a coating liquid containing a pre-foamed composition,
applying the coating liquid on a steel plate to obtain a pre-foamed layer having a thickness of 15 to 50 μm and a foaming factor of 2 to 4, and
foaming the pre-foamed layer by a heat treatment to obtain a foamed rubber layer, wherein the pre-foamed composition comprises:
20 to 70% by weight of a polymer having a mooney value of 10 to 70; and
20 to 60% by weight of a heat decomposable chemical foaming agent, based on the total weight of the composition,
wherein the foamed rubber layer has an open cell ratio of 80% or more.

9. The method for producing a gasket material according to claim 8, wherein the pre-foamed composition further comprises a vulcanizing agent.

10. The method for producing a gasket material according to claim 8, wherein the pre-foamed composition further comprises a vulcanization accelerator.

11. A gasket comprising a structure comprising:
a steel plate; and
a foamed rubber layer disposed on both sides or one side of the steel plate,
wherein the foamed rubber layer is provided by a process comprising foaming a pre-foamed layer comprising a pre-foamed composition, wherein the pre-foamed layer has a thickness of 15 to 50 μm and a foaming factor of 2 to 4, and the pre-foamed composition comprises:
20 to 70% by weight of a polymer having a mooney value of 10 to 70; and
20 to 60% by weight of a heat decomposable chemical foaming agent, based on the total weight of the composition,
wherein the foamed rubber layer has an open cell ratio of 80% or more.

12. The structure according to claim 11, wherein the pre-foamed composition further comprises a vulcanizing agent.

13. The structure according to claim 11, wherein the pre-foamed composition further comprises a vulcanization accelerator.

* * * * *